United States Patent [19]

Hendrix et al.

[11] Patent Number: 4,682,336
[45] Date of Patent: Jul. 21, 1987

[54] Q-SWITCHED LASER RESONATOR OF INTEGRAL CONSTRUCTION

[75] Inventors: James L. Hendrix, Northridge; Leroy O. Braun, Malibu, both of Calif.

[73] Assignee: Hughes Aircraft Company, Los Angeles, Calif.

[21] Appl. No.: 868,381

[22] Filed: May 29, 1986

[51] Int. Cl.⁴ ............................................... H01S 3/11
[52] U.S. Cl. ...................................... 372/10; 372/92; 372/82; 372/11
[58] Field of Search .................................. 372/10–13, 372/108, 92, 82

[56] References Cited
U.S. PATENT DOCUMENTS
4,359,777 11/1982 Fox et al. .............................. 372/82

Primary Examiner—Leon Scott, Jr.
Attorney, Agent, or Firm—Ronald L. Taylor; A. W. Karambelas

[57] ABSTRACT

A Q-switched laser resonator is constructed in the form of an integral, one-piece assembly, thus eliminating the requirement for an optical bench to support the individual components. The integral assembly is constructed by bonding a surface of the Q-switch device to an end of the laser rod, the bonding being accomplished with a layer of transparent adhesive. Similarly, the optical coupler is bonded to the opposite surface of the Q-switch device with a layer of adhesive. The resulting laser resonator assembly is optically aligned prior to the setting of the adhesive layers such that the alignment is permanently maintained after the adhesive sets.

18 Claims, 5 Drawing Figures

Q-SWITCHED LASER RESONATOR OF INTEGRAL CONSTRUCTION

BACKGROUND OF THE INVENTION

1. Field of the Invention

The present invention relates generally to Q-switched laser resonators, and particularly to a Q-switched laser resonator and a method of fabricating same wherein a laser rod, a dye impregnated sheet, or Q-switch, and an output coupler are aligned and subsequently bonded together into a laser resonator assembly having an integral construction.

2. Description of the Prior Art

The known Q-switched laser resonators are constructed, typically, of a laser rod, Q-switch device, and an output coupler and high reflectivity mirror which are each rigidly mounted to an optical bench, the optical bench maintaining the components in relative alignment one to another. Typically, one or more of the components are mounted such that they can be repositioned as required in order to align the resonator after fabrication in order to obtain the proper alignment required for lasing.

As may be appreciated, a Q-switched laser resonator constructed in such a manner has several inherent disadvantages. One disadvantage is that such a resonator is sensitive to vibration due to each constituent component being individually mounted to the rigid optical bench. Another disadvantage, arising from such vibration sensitivity, is that there is a need for frequent realignment, resulting in increased laser maintenance and operation costs. A further disadvantage is that the optical bench increases the size, weight and complexity of the laser resonator, making a laser resonator of such construction less well suited for applications requiring a Q-switch laser resonator having a compact, low cost, and vibration insensitive design.

SUMMARY OF THE INVENTION

An object of the invention is to overcome the above and other shortcomings in the known Q-switched laser resonators.

Another object of the invention is to provide a Q-switched laser resonator having an integral one piece construction, wherein the constituent components are rigidly bonded together, thus eliminating the need for a supportive optical bench.

Still another object of the invention is to provide a Q-switched laser resonator which requires alignment only once, the alignment being accomplished during fabrication and before the constituent components are bonded together, thereby permanently maintaining the initial alignment of the laser components.

A still further object of the invention is to provide a method of alignment and fabrication of an integral Q-switched laser resonator.

In accordance with one embodiment of the invention, a Q-switched laser resonator is comprised of a laser rod, a Q-switch device having the form of a dye impregnated acetate sheet, and an optical coupler which are aligned relative one to another within an alignment fixture. After alignment, the components are bonded together into an integral assembly by a transparent adhesive thereby permanently maintaining the components in alignment. After fabrication, the laser resonator is removed from the fixture and the adhesive allowed to cure. A sealing material is later applied to seal the components and also provide still further structural rigidity to the assembly.

The various features of novelty which characterize the invention are pointed out with particularity in the claims annexed to and forming a part of the disclosure. For a better understanding of the invention, its operating advantages and its specific objects attained by its use, reference should be had to the accompanying drawings and descriptive matter in which there is illustrated and described a preferred embodiment of the invention.

BRIEF DESCRIPTION OF THE DRAWINGS

FIG. 3b is a top view of the alignment and fabrication fixture of FIG. 3a; and

DETAILED DESCRIPTION OF THE INVENTION

Figure 1:
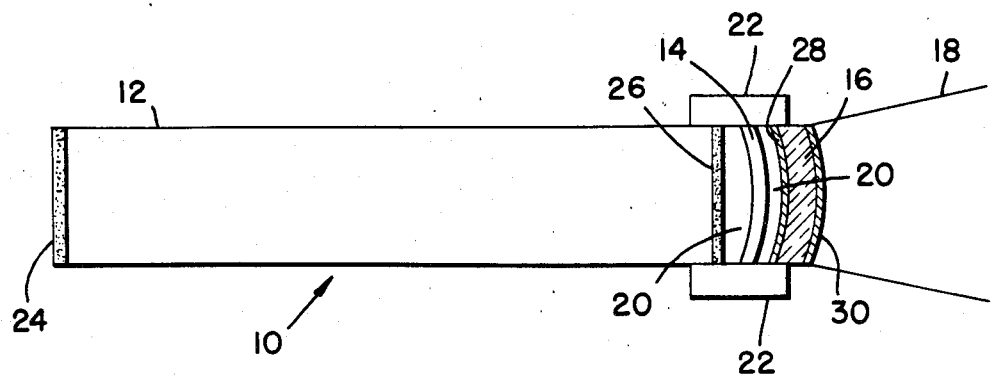
FIG. 1 is a cross-sectional view of an integral Q-switched laser resonator having a plano-biconcave type of configuration which is constructed in accordance with the invention.

FIG. 1 shows a Q-switched laser resonator assembly 10 of a plano-biconcave configuration having an integral construction fabricated in accordance with the invention. Basically, assembly 10 is comprised of a laser rod 12, a Q-switch device having the form of a dye impregnated acetate sheet 14, and an output optical coupler 16 for collimating a pulsed beam 18 of coherent laser radiation passing therethrough. In accordance with the invention sheet 14 has a surface bonded to an end surface of rod 12 and an opposite surface bonded to coupler 16, each surface being bonded with a thin layer of substantially transparent adhesive 20. As may be seen, adhesive 20 bonds rod 12, sheet 14, and coupler 16 together into the integral, rigid assembly 10. Overlying an outer surface of assembly 10, and more specifically that portion of assembly 10 containing adhesive 20, is a layer of sealing material 22. Material 22 seals underlying adhesive 20 from environmental contaminates and, additionally, provides further structural rigidity to assembly 10.

Considering the constituent components of assembly 10 in greater detail it can be seen that laser rod 12 has a substantially round cylindrical shape having opposing end surfaces made optically flat, that is, a centerline of rod 12 is perpendicular to each end surface. The radius of rod 12 in relation to the length is given by the formula: Radius=Length/$(1-g)$, where g is a constant related to a geometric configuration of curvature, as is well known in the art. As may be appreciated, the length of rod 12 may vary from one embodiment to another depending on certain application specific requirements, thereby causing the radius to vary proportionately. Rod 12 is comprised typically, of a high gain lasing material such as Neodymium-YttriumAluminum-Garnet (Nd:YAG), although other similar lasing materials may be used as well. The end surface of rod 12 opposite the end surface through which the pulsed beam 18 of laser radiation exists is coated with a high reflection coating 24, coating 24 typically having a reflection coefficient of greater than 95 percent. The end surface of rod 12 opposite coating 24 may be coated with an anti-reflection coating 26, coating 26 1 typically permitting greater than 99.9 percent of the radiation incident thereon to pass therethrough and exit rod 12. The use and the method of application of such laser rod end surface coatings as described above are well known in the art.

In a preferred embodiment of the invention dye sheet 14 is comprised of a cellulose acetate film impregnated with an organic dye, such as a type manufactured by the Eastman-Kodak Corporation known as Bis (4-dimethylaminodithiobenzil) nickel, (BDN), the dye having the properties of being, for a given range of wavelengths, substantially opaque to electromagnetic radiation below a certain energy level, and being substantially transparent to radiation above the certain energy level. Hence, dye sheet 14 acts to damp, or reduce laser oscillation between coatings 24 and 28 thereby preventing rod 12 from lasing until a high level of inversion is achieved in rod 12, the level of inversion achieved typically being greater than that which would normally be required to cause a lasing action within rod 12 in the absence of dye sheet 14. At some threshold value of inversion, characterized by a high level of energy storage within rod 12, sheet 14 rapidly becomes transparent, or "bleaches", thereby rapidly increasing the Q, or relationship between the stored energy and the rate of dissipation of that energy within rod 12. This rapid increase in the Q of rod 12 results in the emission of a high power, short-duration pulse of coherent laser radiation from rod 12, the pulse passing through the now substatially transparent dye sheet 14. Such a pulse is typically referred to as a "giant pulse". As may be appreciated, dye sheet 14 may be considered to be a switch and, more particularly, a Q-switch. Although the Q-switch of the preferred embodiment of the invention is described herein as being in the form of dye sheet 14, it should be realized that a variety of suitble types may be utilized such as electro-optical switches, acousto-optical switches and "glass" switches such as uranium doped glass.

A third component of assembly 10 is coupler 16 which, in this embodiment of the invention, is partially reflective to the radiation pulse exiting rod 12 and passing through sheet 14. Coupler 16 is made partially reflective by the application of a suitable coating 28 to an inner concave surface of coupler 16, the partially reflective surface providing an amount of energy feedback necessary to sustain the laser action of rod 12. The inner concave surface also serves as a structural support for dye sheet 14. Additionally, this inner surface is given a concave curvature, as is well known in the art, which is determinative of the overall stability of the resonator cavity, the cavity being comprised of the rod 12 and an enclosing structure (not shown in FIG. 1). An outer convex surface of coupler 16 is suitably coated with an anti-reflection coating 30 such that this surface is substantially transparent to the pulsed beam 18. Additionally, this outer convex surface has a curvature which corrects for a spherical component of the divergence of pulsed beam 18, thereby correcting this divergence to an ideal plano-plano value.

Coupler 16 is comprised of a suitable optical material, the specific material chosen depending on the intended laser pulse repetition rate and other application specific parameters.

In accordance with an object of the invention, rod 12, sheet 14, and coupler 16 are bonded together with the foregoing substantially transparent adhesive 20 in order to form a Q-switched laser resonator of integral construction. The adhesive 20 may be of a type manufactured by Hartel Industries characterized as being capable of withstanding high powered pulses of laser radiation without degradation. In addition, adhesive 20 provides for the matching of the optical index of the coating 26 to that of the sheet 14, and also for the sheet 14 to that of the coating 28, thus correcting for the, typically, inherently poor optical surface quality of dye sheet 14.

As has been previously discussed, in order to provide still greater structural strength to assembly 10 the layer of sealing material 22 is applied to a portion of the outer surface of assembly 10 overlying the adhesive bonds made by adhesive 20. In addition to providing greater strength, material 22 also serves as a seal for adhesive 20 and dye sheet 14, thereby preventing the introduction of environment contaminates. Material 22 may be of any suitable type, one such type being manufctured by the Armstrong Corporation and known as A-12.

Figure 2:
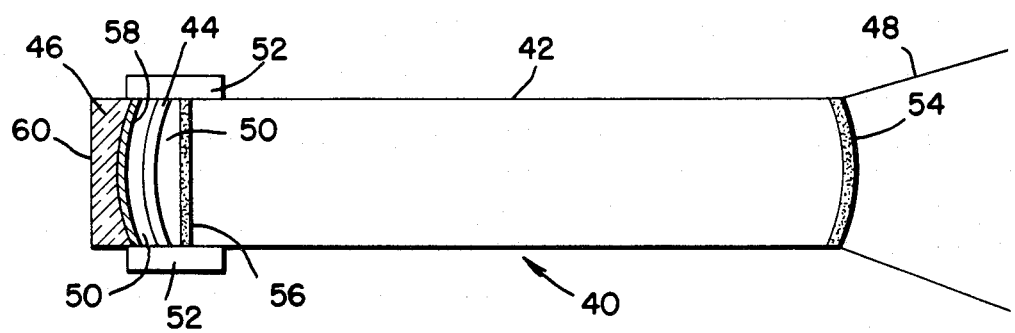
FIG. 2 is a cross-sectional view of an integral Q-switched laser resonator having a plano-convex-concave type of configuration which is also constructed in accordance with the invention.

Referring now to FIG. 2, a second type of integral Q-switched laser resonator assembly 40 is shown which is also constructed in accordance with the invention. Assembly 40 is of a plano-convex-concave type of configuration, wherein the pulsed beam 48 exits an end surface of rod 42, the end surface having a radius which is calculated to increase the stability of assembly 40. In addition, assembly 40 is comprised of a dye sheet 44 which is similar in form and function to the dye sheet 14 of FIG. 1. A reflective coupler 46 has a surface disposed adjacent sheet 44, the surface having a concave curvature. An opposite surface 60 of coupler 46 is flat and is perpendicular to the centerline of assembly 40.

Rod 42, sheet 44, and coupler 46 are bonded together with a thin layer of adhesive 50, such as that disclosed in the embodiment of FIG. 1, in accordance with the invention. A coating of sealing material 52 is applied on a portion of the outer surface of assembly 40, adjacent to sheet 44, to provide a seal for the underlying sheet 44 and adhesive 50 and also to provide greater structural strength.

The end surface of rod 42 from which pulsed beam 48 exits is coated with a layer of anti-reflection coating 54, while the flat end adjacent to adhesive 50 is treated with an optical index matching coating 56 in order to match the optical index of the layer of adhesive 50. The concave surface of reflector 46 is coated wth a layer of high reflection coating 58, while the flat surface 60 opposite coating 58 may be left untreated, or made frosted, or left partially untreated such that a portion of the radiation within assembly 40 may be sampled therethrough.

The operation of assembly 40 is similar to that of the assembly 10 of FIG. 1, that is dye sheet 44 prevents the lasing action of rod 42 until a greater than normal degree of energy storage is achieved within rod 42, at which time sheet 44 become substantially transparent, thereby allowing a pulse of coherent laser radiation to exit rod 42 and pass through sheet 44. In this embodiment of the invention the pulse of laser radiation reflects from the reflective concave surface of coupler 46 thereby passing once more through sheet 44 and rod 42, to be emitted as an intense, pulsed beam 48 of radiation.

A Q-switched laser resonator wherein the Q-switch and coupler are disposed at an end of the laser rod opposite the end through which the radiation exits (as in FIG. 2) is employed, typically, in those applications where the output power of the pulsed beam is sufficient to detrimentally affect the structural integrity of the Q-switch material or coupler. In practice, however, the theory of operation of both types of Q-switched laser resonators, namely those shown in FIG. 1 and FIG. 2, are identical. Additionally, as is well known in the art, a large variety of various configurations of Q-switched laser resonators may exist, the varieties differing one from the other in, for example, the type of output coupler or reflective coupler utilized, such as a corner reflective type, or a plano-plano type. It should be appreciated, however, that each of the variety of types of Q-switched laser resonator may be amenable to construction in an integral form by the method of the invention, thereby accruing to the many benefits derived therefrom, as has been described above.

Figure 3A:
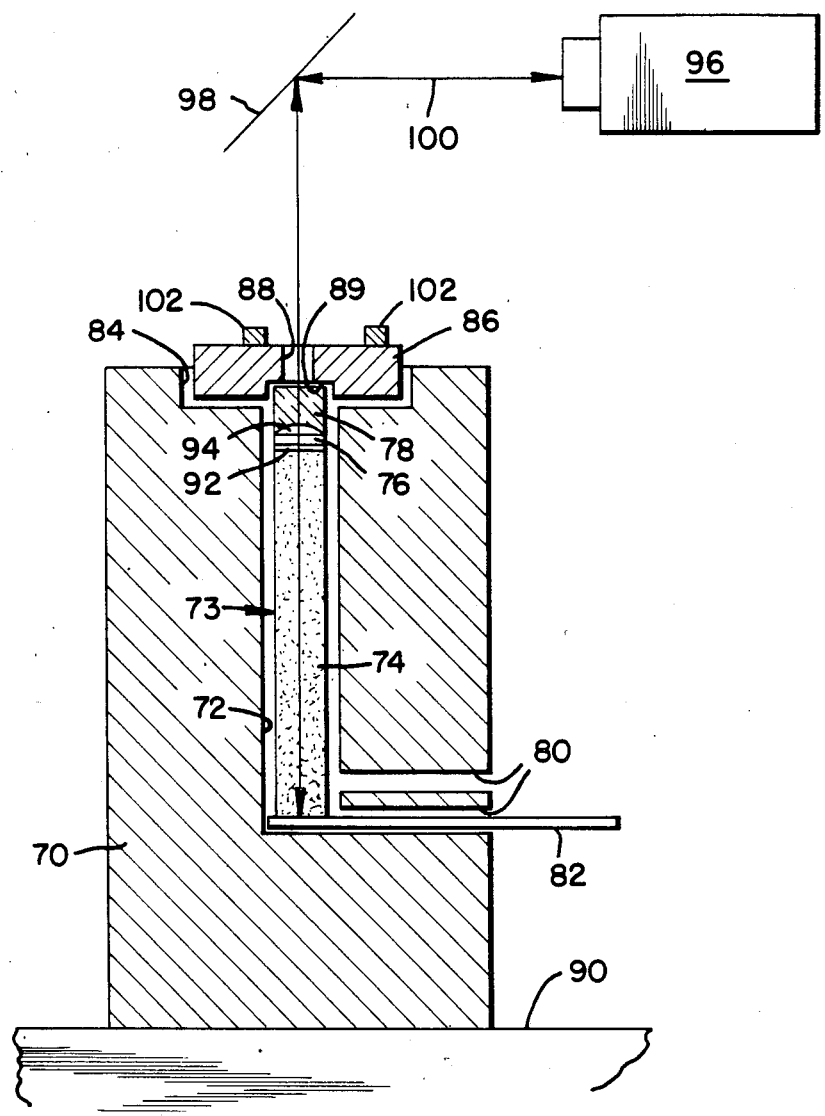
FIG. 3a is a cross-sectional view showing an alignment and fabrication fixture and other apparatus which are utilized to realize the method of the invention.
Figure 3B:
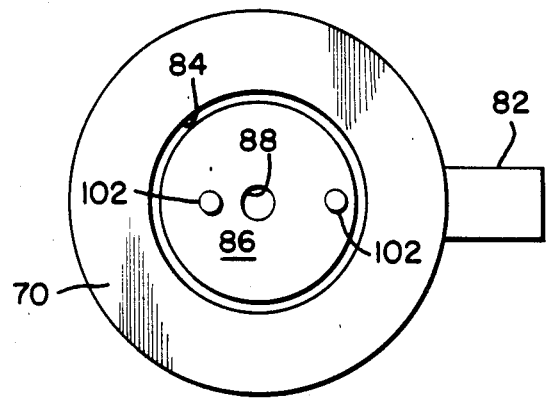

As shown in FIGS. 3a and 3b, an alignment and fabrication fixture 70 is comprised, typically, of aluminum, and is provided with a centrally disposed channel 72 having a round cylindrical shape for snuggly containing a laser assembly 73 during construction thereof. Assembly 73 is comprised of a laser rod 74, a Q-switch device in the form of a dye sheet 76, and an optical coupler 78. Communicating perpendicularly with channel 72 are a plurality of side channels 80 made through the outer surface of fixture 70, the side channels 80 each having a substantially rectangularly shaped outer opening such that a rod supporting structure 82 may pass freely therethrough and be inserted within channel 72. In practice, only one of the plurality of openings 80 will contain the support 82 at any given time, the selection of which opening 80 which will contain support 82 being determined by the length of rod 74. Thus, a number of rods of varying lengths may be accomodated by fixture 70 in a simple and cost effective manner. Support 82 has a substantially rectangular surface shape and a thin rectangular cross-sectional shape, much like that of a typical microscope slide. Disposed above and communicating with chamber 72 is a second round cylindrical chamber 84 which has a diameter larger than that of chamber 72. Chamber 84 is provided in order that an alignment head 86 may be introduced therein. Head 86 is comprised, typically, of aluminum and is of a round cylindrical shape having a centrally disposed aperture 88 made therethrough. Aperture 88 terminates in a cylindrical shelf 89 of increased diameter to envelope an end portion of coupler 78 therein. As may be seen in FIG. 3a, chamber 72 has a depth such that, in conjunction with the thickness of support 82 and the overall length of assembly 73, coupler 78 will extend upwards into chamber 84 and set within the shelf 89. Thus, head 86 will rest on and be supported by the underlying coupler 78, dye-sheet 76, rod 74 and support 82.

A suitable method of construction of the assembly 73 is as follows. The laser rod 74, having its end surfaces suitably coated, is first inserted within the chamber 72 of fixture 70. Fixture 70 is supported upon a level, rigid work surface 90, such as an optical bench, wherein the rod 74 is disposed vertically thereon, a centerline of rod 74 being perpendicular to the level work surface 90. A first layer 92 of adhesive, having a viscous consistency is applied to an upper end surface of rod 74, the layer 92 having a thickness of, typically, one ten thousandths to one thousandths of an inch. Dye sheet 76 is then positioned upon layer 92, a lower surface of sheet 76 being disposed substantially parallel to the upper surface of rod 74. A second layer 94 of viscous adhesive is applied to the upper surface of sheet 76, the second layer 94 having a thickness comparable to that of the first layer 92. Next, the output coupler 78 is placed upon adhesive layer 94. Finally, head 86 is placed over the upper surface of coupler 78, the weight of head 78 acting to urge the underlying coupler 78 and sheet 76 downwards towards the upper end surface of rod 74.

Inasmuch as adhesive layers 92 and 94 will set, thereby becoming hard and inflexible, within approximately two hours, it is necessary to optically align assembly 73 soon after completing the construction thereof. The optical alignment is carried out with an interferometer 96, of well known construction, in conjunction with a flat reflective mirror 98. Mirror 98 is required because most known interferometers are designed to be used when disposed in a subtantially horizontal plane relative to a worksurface, such as an optical bench. Since fixture 70 orients assembly 73 in a vertical plane relative to work surface 90, mirror 98 is disposed such that it reflects at a 90 degree angle the beam 100 of alignment emanating from the horizontally disposed interferometer 96. Thus the beam 100 is caused to enter the upper surface of coupler 78, the beam 100 passing through the aperture provided in head 86. The beam 100 traverses through assembly 73, is reflected from a reflective coating at the opposite end of rod 74, if rod 74 is so coated, or from a reflective surface of support 82. The beam 100, after reflection, passes back through assembly 73, is reflected once more by mirror 98, and returns to enter interferometer 96.

The function of interferometer 96, as is well known in the art, is to compare the phase of the wavelengths of an output light beam to that of a returning light beam, thereby creating a plurality of concentric interference rings. In the method of the invention, the rings are indicative of the degree of alignment of the constituent components of assembly 73. In the method of alignment as shown in FIG. 3, assembly 73 is considered to be properly aligned when the center of the concentric interference rings observed at interferometer 96 are at a distance of approximately ten percent of the diameter of rod 74 from the center of rod 74.

To achieve this degree of alignment a plurality of small weights 102, two for which are shown in FIGS. 3a and 3b, may be placed at various positions on an upper surface of head 86. The purpose of each weight 102 is to exert a downward force on head 86, which force is transmitted to the underlying coupler 78 and sheet 76.

As may be appreciated, before the layers 92 and 94 of adhesive set, or harden, they remain in the viscous state. Thus, the sheet 76 and coupler 78 may be thought of as "floating" on these viscous adhesive layers 92 and 94. By exerting one or more downward directed forces on these components, their planar orientation may be changed relative to the end surface of rod 74. Thus, the operator of the interferometer may, by observing the pattern of interference rings, make adjustments to the numbers and positions of weights 102, until alignment of assembly 73 is achieved. When the proper degree of alignment is obtained, the layers 92 and 94 of adhesive are allowed to complete the setting process undisturbed, at which time sheet 76 and coupler 78 will be rigidly held in the proper position relative to the adjacent end surface of rod 74 to assure the alignment of assembly 73. Sometime after the adhesive setting period has expired, the assembly 73 is removed from fixture 70 and stored in a vertical position for, typically, one week in order to permit the layers 92 and 94 of adhesive to fully cure, thereby achieving their maximum hardness.

After this curing period, the aforementioned layer of sealing material (not shown in FIGS. 3a and 3b) is applied, thereby completing the construction of the Q-switched laser assembly 73.

Inasmuch as the layers 92 and 94 form a portion of the optical path of radiation emanating from assembly 73, the uniformity of these layers 92 and 94 is an important goal during the construction of assembly 73. As may be appreciated, the vertical disposition of fixture 70 provides several advantages in the construction of assembly 73 related to achieving this goal of uniformity. One advantage is that adhesive layers 92 and 94, while in the viscous state, are acted upon uniformily by gravity. Thus, the thickness of each layer 92 and 94 is made substantially uniform due to the downwardly directed force exerted by the weight of head 86 in conjunction with the leveling effect of gravity acting uniformly over each layer of adhesive. A further advantage to be gained by the vertical disposition of fixture 70 is that the uniform spreading of adhesive layers 92 and 94 due to capillary action is facilitated, thus ensuring a microconformance of layers 92 and 94 with the adjacent surfaces of rod 74, sheet 76, and coupler 78.

Figure 4:
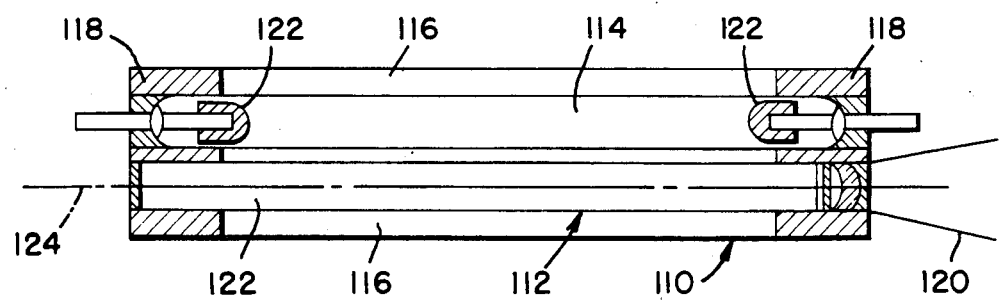
FIG. 4 is a cross-sectional view of a laser system employing the integral Q-switched laser resonator of the invention.

Referring now to FIG. 4 there is shown a laser system 110 comprised of a Q-switched laser resonator 112, constructed in accordance with the invention, and a flashlamp 114 disposed adjacent to resonator 112 for providing a source of excitation radiation to resonator 112. Resonator 112 and flashlamp 114 are enclosed within a reflector cavity 116, cavity 116 reflecting the radiation eminating from flashlamp 114 such that substantially all of the radiation will impinge upon resonator 112. Cavity 116 is supported at each end by a support 118, the support 118 further having an opening made therein for permitting a pulsed beam 120 of laser radiation to exit therethrough. In operation, the pair of electrodes 122 are energized by the application a suitable voltage thereby ionizing a gas (not shown) within flash lamp 114. Energizing electrodes results in a high intensity burst, or flash, of electromagnetic radiation to be emitted by flashlamp 114. A portion of the radiation is incident upon laser rod 122 and is absorbed therein, while that radiation impinging on the walls of reflective cavity 116 is reflected back into rod 122 to also be absorbed. Due to the physical characteristics of rod 122, rod 122 will begin to fluoresce, thereby re-emitting that radiation absorbed from flashlamp 114. A portion of the reemitted radiation will, statistically, be directed coincident with the optical axis 124 of resonator 112, thereby initiating the lasing action of resonator 112 by a well known mechanism.

As may be appreciated, the unitized Q-switched laser resonator of the invention provides several advantages when used within the system 110. One such advantage is that a system having a compact and relatively simple construction can be achieved, in that the supportive optical bench of the prior art is not required to be accommodated within the system 110. Additionally, the system 110 is less susceptable to vibration and mechanical shock, thereby permitting its use in environments which would be detrimental to systems constructed with resonators of the prior art. An additional further advantage is that the overall system 110 construction and maintenance costs are reduced.

While the forgoing description represents a preferred embodiment of the apparatus and method of the present invention, it will be obvious to those skilled in the art that various changes and modifications may be made therein, without departing from the true spirit and scope of the present invention.

What is claimed is:

1. A Q-switched laser resonator having an integral construction comprising a laser rod, a Q-switch device having a first and a second surface, and an optical coupler, and further comprising:
   first bonding means for bonding the first surface of said Q-switch device to an end surface of said rod; and
   second bonding means for bonding the second surface of said Q-switch device to said coupler.

2. The resonator of claim 1 wherein said first bonding means is a first layer of adhesive material and said second bonding means is a second layer of adhesive material.

3. The resonator of claim 2 wherein said first layer of adhesive material is interposed between the end surface of said rod and the first surface of said Q-switch device and, wherein said second layer of adhesive is interposed between the second surface of said Q-switch device and said coupler.

4. The resonator of claim 3 wherein said first and said second layers of adhesive bond said rod, said Q-switch, and said coupler into an integral, rigid assembly.

5. The resonator of claim 4 further comprising:
   sealing means overlying outer peripheral surfaces of said rod, said first adhesive layer, said Q-switch, said second adhesive layer, and said coupler; said sealing means excluding environmental contaminates from passing therethrough.

6. The resonator of claim 5 wherein said Q-switch device is a sheet of acetate impregnated with an organic dye, said dye being substantially opaque to energy of a given wavelength and a first energy level, and wherein said dye is substantially transparent to energy of the given wavelength and a second, greater energy level.

7. The resonator of claim 6 wherein said organic dye comprises Bis (4-dimethylaminodithiobenzil) nickel.

8. A method of constructing an integral Q-switched laser resonator assembly, the assembly being comprised of a laser rod, a Q-switch device having a first surface and a second surface, and an optical coupler, comprising the steps of:
   providing an alignment and fabrication fixture, the fixture being suitable for containing the rod, the device, and the coupler in during construction of the assembly;
   placing the laser rod within the fixture;
   applying a first bonding means to bond the first surface of the Q-switch device to an end surface of the rod;
   applying a second bonding means to bond the second surface of the Q-switch device to the optical coupler;
   aligning the laser rod, the Q-switch device, and the coupler one to another such that the assembly is operable for providing coherent radiation when operably coupled to a source of excitation radiation.

9. The method of claim 8 wherein said step of aligning further comprises the steps of:
- providing an interferometer means operable for transmitting and receiving waves of alignment radiation, the means further being operable for detecting and indicating a difference in phase between the transmitted and the received waves of alignment radiation;
- mounting a moveable alignment head such that it overlies an end of the assembly, whereby a movement of the head further causes a movement of the coupler and the device relative one to another and to the end surface of the rod, the head further having an aperture for permitting the passage of the alignment radiation therethrough into the assembly and also the passage therethrough of reflected alignment radiation out of said assembly; and
- observing the indicated difference in phase of the transmitted and received alignment radiation while moving the head until said indicated difference equals a given value, thereby placing the head and the coupler in an aligned position relative to the rod.

10. The method of claim 9 wherein the steps of applying the first bonding means and the second bonding means are accomplished by applying a first layer of adhesive and by applying a second layer of adhesive.

11. The method of claim 9 wherein the steps of applying the first bonding means and the second bonding means are accomplished by applying a first layer of adhesive having a viscous consistency and by applying a second layer of adhesive having a viscous consistency, thereby permitting movement of the coupler and the device by the alignment head during the step of observing.

12. The method of claim 11 further comprising the step of allowing the first layer of adhesive and the second layer of adhesive to set subsequent to said step of aligning, thereby permanently maintaining the head and the device in the aligned position.

13. The method of claim 12 further comprising the step of sealing the assembly such that environmental contaminates are excluded from contact with the adhesive, the Q-switch device, the coupler, and the end surface of the rod.

14. The method of claim 8 wherein the step of placing includes an orienting of the rod in a substantially vertical position.

15. A laser system comprised of an excitation radiation source means coupled to a Q-switched laser resonator assembly, said assembly being of an integral construction, said assembly being operable for generating coherent laser radiation when excited by said radiation source means.

16. The laser system of claim 15 wherein said assembly is comprised of a laser rod, a Q-switch device, and an optical coupler, and further comprises:
- a first bonding means for bonding said rod to said device; and
- a second bonding means for bonding said coupler to said device.

17. The laser system of claim 16 wherein each of said first bonding means and said second bonding means is a layer of adhesive.

18. The laser system of claim 17 wherein said excitation radiation source means comprises:
- a flashlamp means operable for providing radiation suitable for exciting said assembly to generate said coherent laser radiation;
- a voltage source means operable for energizing said flashlamp means for providing said radiation; and
- reflector means enclosing said flashlamp means and said assembly, said reflector means being suitable for reflecting said excitation radiation such that substantially all of said excitation radiation is coupled to said assembly.

* * * * *